US010791892B2

(12) United States Patent
Schultz

(10) Patent No.: US 10,791,892 B2
(45) Date of Patent: Oct. 6, 2020

(54) SLIDE OUT VACUUM DRUM INCLUDING DUAL-ACTION LATCHING MECHANISM

(71) Applicant: Emerson Electric Co., St. Louis, MO (US)

(72) Inventor: Douglas C. Schultz, Glen Carbon, IL (US)

(73) Assignee: Emerson Electric Co., St. Louis, MO (US)

( * ) Notice: Subject to any disclaimer, the term of this patent is extended or adjusted under 35 U.S.C. 154(b) by 374 days.

(21) Appl. No.: 15/381,476

(22) Filed: Dec. 16, 2016

(65) Prior Publication Data
US 2018/0168413 A1  Jun. 21, 2018

(51) Int. Cl.
| *A47L 9/14* | (2006.01) |
| *A47L 7/00* | (2006.01) |
| *B60S 1/64* | (2006.01) |
| *A47L 5/36* | (2006.01) |
| *A47L 5/28* | (2006.01) |
| *A47L 9/22* | (2006.01) |

(52) U.S. Cl.
CPC ........... *A47L 7/0076* (2013.01); *A47L 9/1427* (2013.01); *B60S 1/64* (2013.01)

(58) Field of Classification Search
None
See application file for complete search history.

(56) References Cited

U.S. PATENT DOCUMENTS

| 2,135,105 | A  | * | 11/1938 | Knauff | E05C 3/046 292/206 |
| 3,811,718 | A  | * | 5/1974 | Bates | E05C 3/045 292/241 |
| 6,116,665 | A  | * | 9/2000 | Subliskey | E05B 17/2003 292/241 |
| 6,385,810 | B1 | * | 5/2002 | Lang | A47L 9/102 15/352 |
| 7,836,546 | B2 | * | 11/2010 | Yoo | A47L 9/1691 15/351 |
| 8,973,196 | B2 |   | 3/2015 | Tomasiak | |
| 2007/0209149 | A1 | * | 9/2007 | Lee | A47L 9/1691 15/352 |
| 2009/0100635 | A1 | * | 4/2009 | Yoo | A47L 9/1683 15/350 |
| 2014/0373306 | A1 | * | 12/2014 | Tomasiak | A47L 9/009 15/347 |
| 2016/0068141 | A1 |   | 3/2016 | Schultz et al. | |

\* cited by examiner

*Primary Examiner* — Brian D Keller
(74) *Attorney, Agent, or Firm* — Armstrong Teasdale LLP

(57) ABSTRACT

A vacuum cleaning system includes a housing defining an inlet and an outlet, a motor connected to the housing and configured to generate air flow through the housing from the inlet to the outlet, and a debris container received within the housing in a first direction. The debris container includes a knob that is rotatable about an axis and includes a first cam and a second cam. Rotation of the knob about the axis causes the first cam to engage the housing and thereby move the debris container in the first direction, and causes the second cam to engage the housing and thereby move the debris container in a second direction.

20 Claims, 9 Drawing Sheets

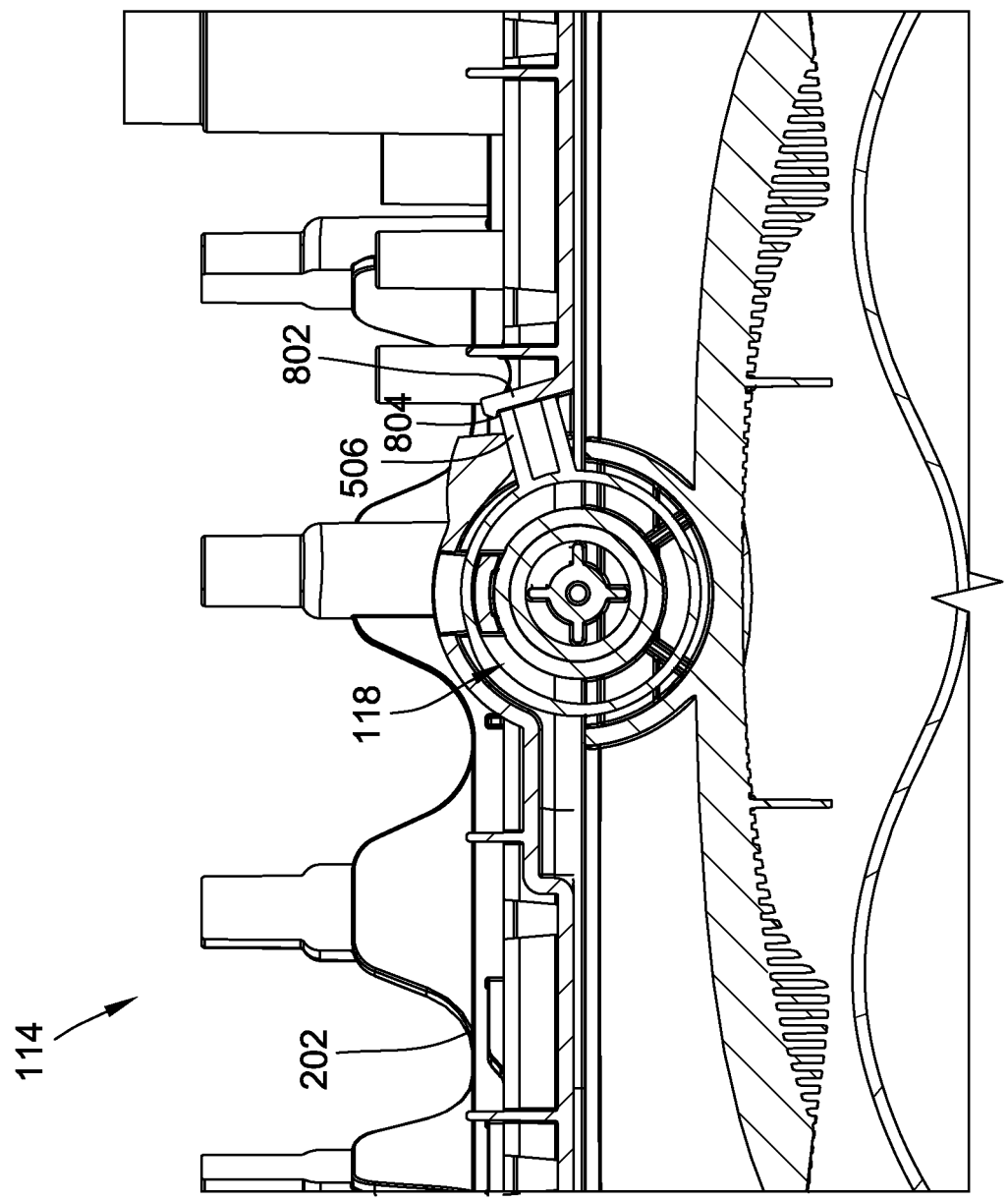

SLIDE OUT VACUUM DRUM INCLUDING DUAL-ACTION LATCHING MECHANISM

FIELD

The field of the disclosure relates generally to vacuum cleaning systems, and more particularly, to latching mechanisms for securing a slide-out drum within a vacuum cleaning system.

BACKGROUND

Vacuum cleaners typically include a suction unit, a conduit (e.g., a flexible hose or tube) connected to the suction unit, and a canister or drum in which the suctioned debris is collected and stored. In some vacuum cleaners, the drum is mounted in a housing and slidable out of the housing to ease emptying of the drum. Some vacuum drums include multiple latches to secure the vacuum drum to the vacuum cleaner housing. Known latching mechanisms of existing slide-out drums require that the drum be secured to the vacuum cleaner housing in multiple locations and/or require a user to use two hands to secure the latches.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a vacuum cleaning system includes a housing defining an inlet and an outlet, a motor connected to the housing and adapted to generate air flow through the housing from the inlet to the outlet, and a debris container received within the housing in a first direction. The debris container includes a knob that is rotatable about an axis and includes a first cam and a second cam. Rotation of the knob about the axis causes the first cam to engage the housing and thereby move the debris container in the first direction, and causes the second cam to engage the housing and thereby move the debris container in a second direction.

In another aspect, a drum assembly for a vacuum cleaning system includes a housing, a debris container received within the housing in a first direction, and a knob connected to the debris container for rotation about an axis. The knob includes a first cam and a second cam. Rotation of the knob about the axis causes the first cam to engage the housing and thereby move the debris container in the first direction, and causes the second cam to engage the housing and thereby move the debris container in a second direction.

In yet another aspect, a method of using a vacuum cleaning system including a housing defining an inlet and an outlet, and a motor adapted to generate air flow through the housing from the inlet to the outlet is provided. The method includes inserting a debris container into the housing, where the debris container includes a knob having a first cam and a second cam, and the knob is rotatable from a first, unlatched position to a second, latched position. The method further includes rotating the knob from the first position to the second position. Rotation of the knob from the first position to the second position causes the first cam to engage the housing and thereby move the debris container in a first direction, and causes the second cam to engage the housing and thereby move the debris container in a second direction Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

FIG. 9 is a partial sectional view of the drum assembly shown in FIG. 2.

Corresponding reference characters indicate corresponding parts throughout the several views of the drawings.

DETAILED DESCRIPTION

Figure 1:
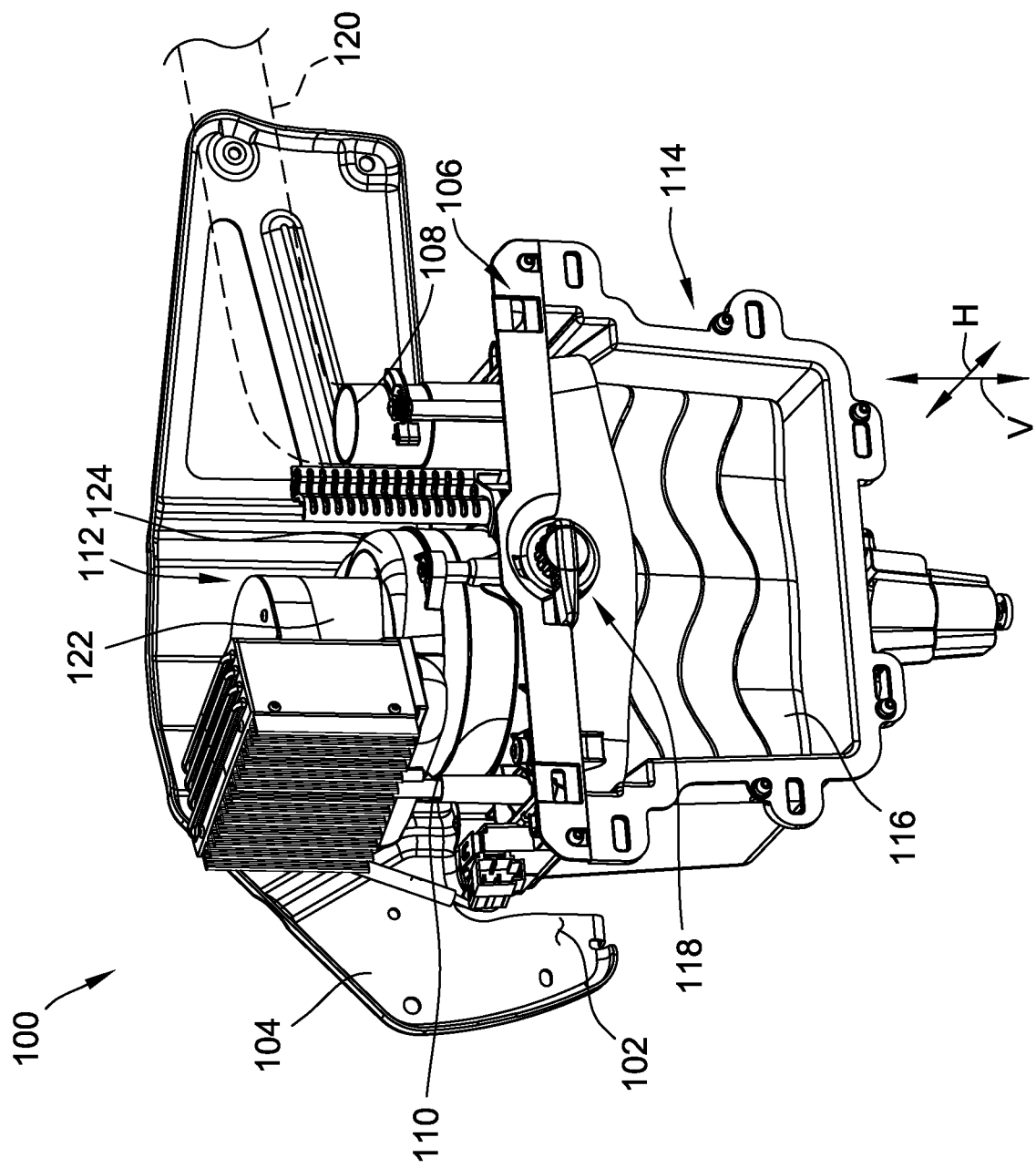
FIG. 1 is a perspective view of an example vacuum cleaning system as embodied in a vehicular vacuum cleaner.

FIG. 1 is a perspective view of an example vacuum cleaning system 100, as embodied in a vehicular vacuum cleaner. Specifically, the vacuum cleaning system 100 of the illustrated embodiment is designed for mounting in and use in a vehicle such as an automobile, recreational vehicle, watercraft, or aircraft. In this example, the vacuum cleaning system 100 connects to a power supply of the vehicle, and, as shown in FIG. 1, is positioned within a cavity 102 of the vehicle defined between two vehicle panels 104, one of which is shown in FIG. 1. Although the vacuum cleaning system 100 is shown and described with reference to a vehicular vacuum cleaner, the vacuum cleaning system 100 and features thereof may be embodied in vacuum cleaners other than vehicular vacuum cleaners including, for example and without limitation, wet/dry vacuum cleaners, canister vacuum cleaners, upright vacuum cleaners, and backpack vacuum cleaners.

In the example embodiment, the vacuum cleaning system 100 generally includes a housing 106 defining an inlet 108 and an outlet 110, a suction unit 112 connected to the housing 106 and configured to generate air flow through the housing 106 from the inlet 108 to the outlet 110, and a drum assembly 114 that includes a drum or debris container 116 that slides into and out of the housing 106 in a horizontal direction H (generally, a first direction). As described in more detail herein, the debris container 116 includes a dual-action latching mechanism or knob 118 that facilitates securing the debris container 116 to the housing 106. In particular, the dual-action latching mechanism 118 facilitates moving the debris container in both the horizontal direction H and a vertical direction V (generally, a second direction) oriented perpendicular to the horizontal direction H to secure the debris container 116 to the housing 106. The vacuum cleaning system 100 also includes a vacuum conduit 120, shown in broken lines in FIG. 1, that connects to the inlet 108 and enables a user to selectively direct suction generated by the vacuum cleaning system 100 to a desired location.

The suction unit 112 generally includes a motor 122 and a fan or impeller assembly 124 operatively connected to the motor 122 to drive the fan and generate suction or negative pressure to permit debris and other material to be collected via the vacuum conduit 120. Generally, the motor 122 is connected to the housing and is adapted to generate air flow through the housing from the inlet to the outlet. In the illustrated embodiment, the suction unit 112 is connected to the outlet 110 of the housing 106, and establishes a negative pressure or vacuum within the debris container 116 when activated. Negative pressure established by the suction unit 112 is transferred to the vacuum conduit 120, and creates suction along the vacuum conduit 120, thereby allowing dust and debris to be entrained within suction flow, and deposited in the debris container 116. In some embodiments, the vacuum cleaning system 100 may also include one or more filter or media assemblies interfaced between the vacuum inlet 108 and the impeller assembly 124 to collect finer particles or media entrained within the suction flow generated by the vacuum cleaning system 100.

Figure 2:
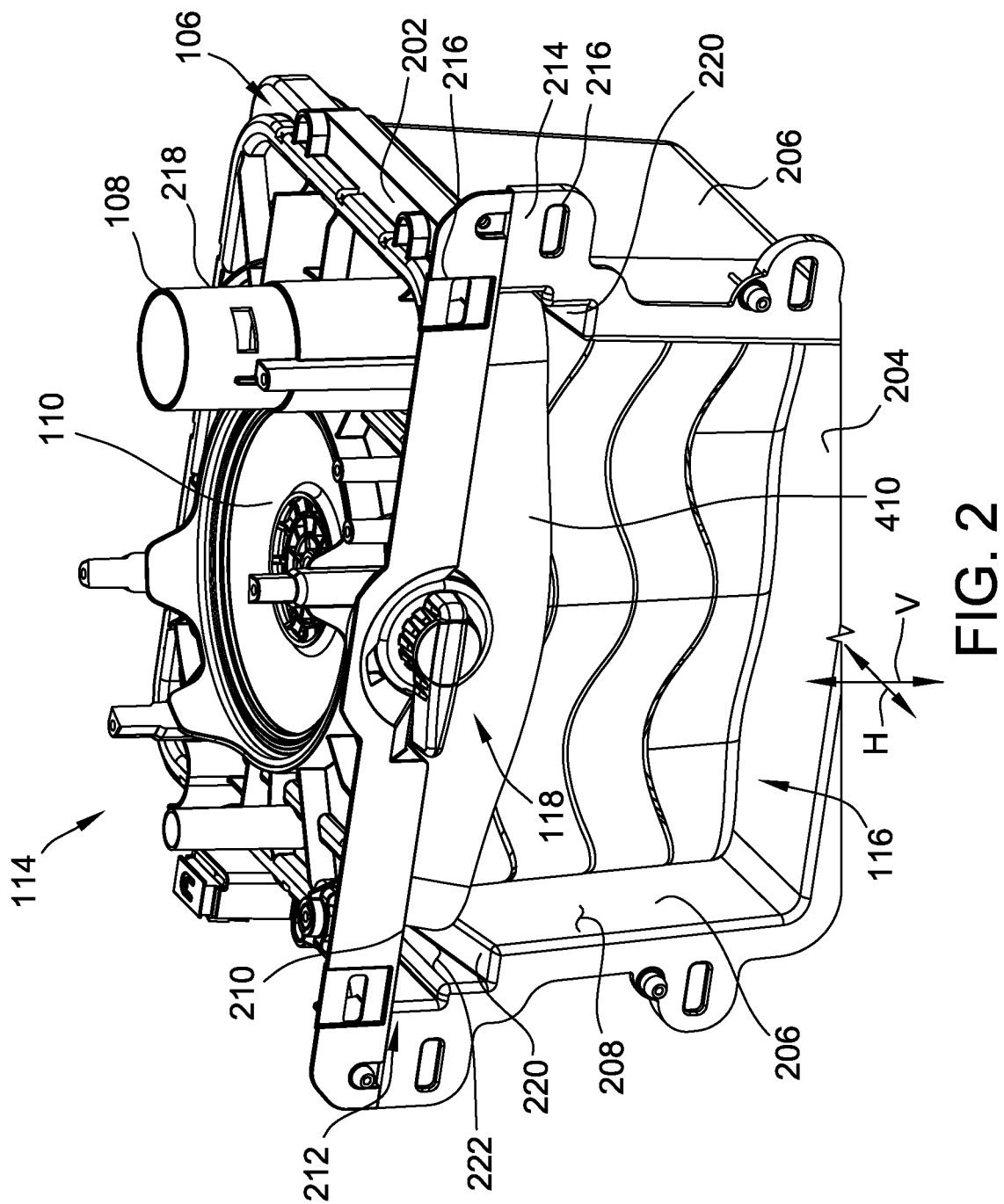
FIG. 2 is a perspective view of a drum assembly of the vacuum cleaning system shown in FIG. 1.

With additional reference to FIG. 2, the housing 106 of the example embodiment includes a top panel 202, a bottom panel 204, and a pair of opposing side panels 206 extending between the top panel 202 and the bottom panel 204. Together, the top panel 202, bottom panel, and side panels 206 at least partially define a receptacle 208 in which the debris container 116 is received. An opening 210 is defined at a front 212 of the housing 106 to allow the debris container 116 to be inserted into and removed from the receptacle 208.

The housing 106 of the example embodiment also includes a mounting panel or flange 214 that adjoins each of the top panel 202, the bottom panel 204, and the side panels 206 at the front 212 of the housing 106. The mounting flange 214 extends generally outward at an angle of about 90° from each of the top panel 202, the bottom panel, and the side panels 206 to define a substantially flush or planar surface for connection to a panel of the vehicle in which the vacuum cleaning system 100 is installed. The mounting flange 214 includes a plurality of fastener openings 216 sized and shaped to receive corresponding fasteners therein to secure the housing 106 to a vehicle panel.

In the example embodiment, the inlet 108 and the outlet 110 are both defined along the top panel 202 of the housing 106. Further, in the example embodiment, the inlet 108 is defined by a cylindrical tube 218 that extends outward from the top panel 202 and defines a connection interface for connection to the vacuum conduit 120. In other embodiments, the inlet 108 and the outlet 110 may be defined at any location on the housing 106 that enables the vacuum cleaning system 100 to function as described herein.

Still referring to FIG. 2, in the example embodiment, each of the side panels 206 includes a ledge 220 that least partially defines a slot 222 extending rearward (i.e., away from the front 212 of the housing 106) into the housing 106 in the horizontal direction H. Each slot 222 is sized and shaped to receive a corresponding component of the debris container 116 to facilitate sliding the debris container 116 into and out of the housing 106 in the horizontal direction H.

Figure 3:
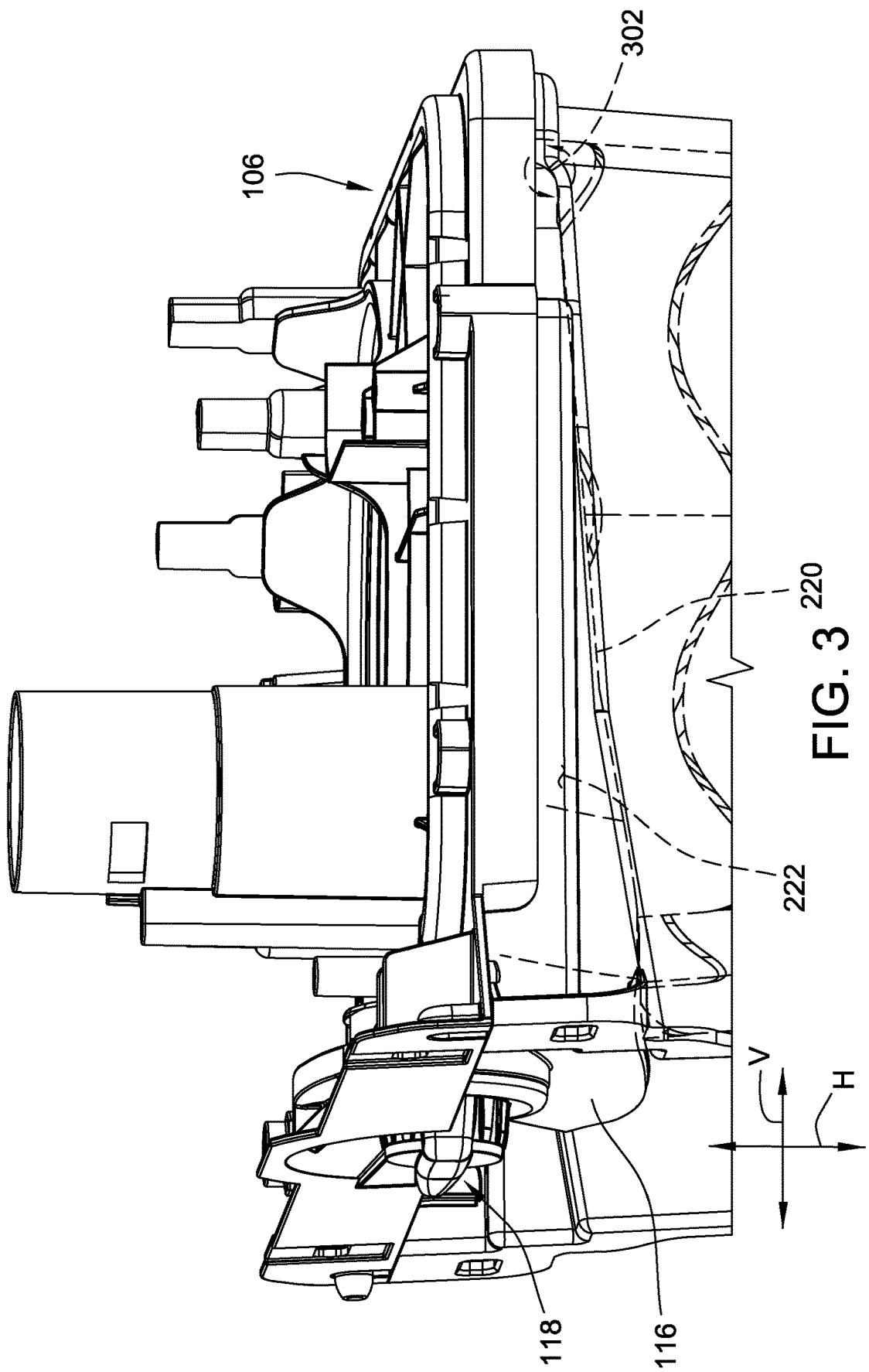
FIG. 3 is a perspective side view of the drum assembly shown in FIG. 2.

With additional reference to FIG. 3, in the example embodiment, each of the ledges 220 defines a pivot point 302 located rearwardly in the corresponding slot 222. As shown in FIG. 3, when the debris container 116 is fully inserted into the receptacle 208, the debris container 116 engages the pivot point 302. Rotation of the knob 118 causes the debris container 116 to be pulled further inward into the housing 106 in the horizontal direction H, and thereby causes the debris container 116 to rotate about the pivot point 302, and a front 402 of the debris container 116 (shown in FIG. 4) to move upward in the vertical direction V, as described in more detail herein.

Figure 4:
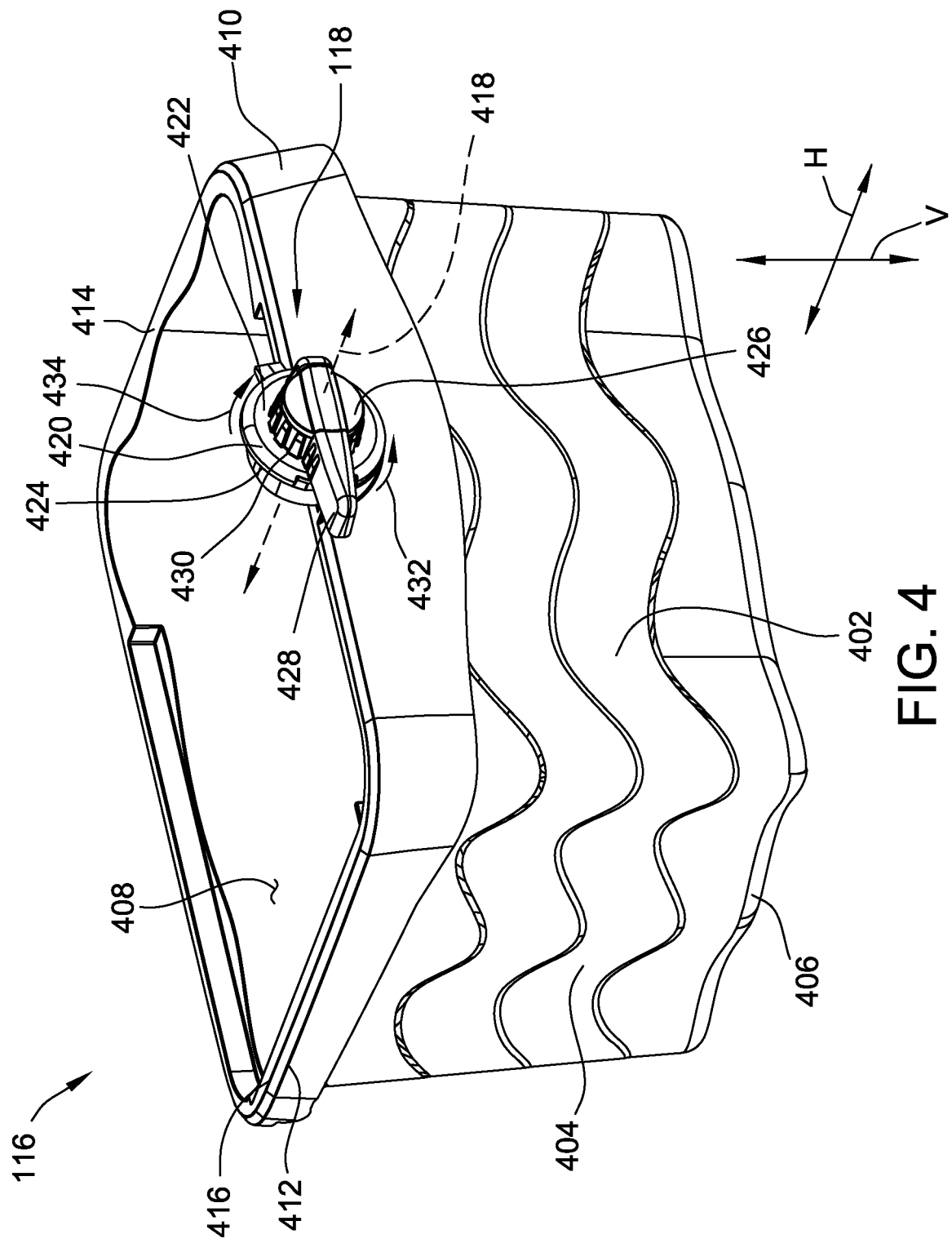
FIG. 4 is a perspective view of a debris container of the drum assembly shown in FIG. 2.

With additional reference to FIG. 4, the debris container 116 generally includes a sidewall 404 and a bottom wall 406 that together define a storage cavity 408 in which debris and other particles collected by the vacuum cleaning system 100 are stored. The debris container 116 is removable from the housing 106 by sliding the debris container 116 out of the receptacle 208 forward in the horizontal direction H. The debris container 116 also includes a lip or rim 410 extending around an upper edge 412 of the debris container 116. The rim 410 is sized and shaped to be received in each of the slots 222 defined by the side panels 206 to facilitate sliding the debris container 116 into and out of the housing 106. Further, in the example embodiment, the rim 410 has an inverted U-shape along the front 402 of the debris container 116 to define a handle to facilitate grasping of the rim 410 for removal and replacement of the debris container 116.

In the example embodiment, the rim 410 extends continuously and entirely around the upper edge 412 of the debris container. In other embodiments, the rim 410 may extend around less than the full perimeter of the upper edge 412 of the debris container 116, and/or may extend discontinuously around the upper edge 412 of the debris container 116.

In the example embodiment, the debris container 116 also includes a seal 414 disposed along an upper surface 416 of the debris container 116. The seal 414 extends continuously around the upper surface 416 of the debris container 116 such that, when the debris container 116 is inserted into and latched to the housing 106, the seal 414 forms a seal around the storage cavity 408 to provide a substantially leak-free flow path from the inlet 108 to the outlet 110. In other embodiments, the seal 414 may be disposed on a lower surface of the housing 106 adjacent the upper surface 416 of the debris container 116. In yet other embodiments, the seal 414 may be disposed at any suitable location that enables the vacuum cleaning system 100 to function as described herein.

The knob 118 is connected to the debris container 116 for rotation about a rotation axis 418. In the example embodiment, the rotation axis 418 is parallel to the horizontal direction H. In other embodiments, the rotation axis 418 may be oriented other than parallel (i.e., at an oblique angle to) the horizontal direction H.

In the example embodiment, the knob 118 includes a base 420 including a front or first side 422 that faces generally away from the debris container 116, and a rear or second side 424 that faces generally towards the debris container 116. In the example embodiment, the knob 118 further includes a central annular portion 426 extending outward from the first side 422 of the base 420, and a handle 428 connected to and extending radially outward from the central annular portion 426. Further, in the example embodiment, the knob 118 includes a plurality of ribs or ridges 430 disposed circumferentially about the central annular portion 426 to facilitate gripping and rotating the knob 118.

The knob 118 is rotatable about the rotation axis 418 in a first rotational direction, indicated by arrow 432 in FIG. 4, and a second rotational direction, indicated by arrow 434 in FIG. 4, opposite the first rotational direction 432. Moreover, the knob 118 is rotatable between a first, unlatched position and a second, latched position (shown in FIG. 4). Specifically, when the knob 118 is in the first position, rotation of the knob 118 in the second rotational direction 434 will move the knob 118 into the second, latched position. In the example embodiment, the knob 118 is rotated by about 90° from the first position to the second position. That is, the knob 118 rotates by a quarter of a full revolution to move from the unlatched position to the latched position. In other embodiments, the first and second positions of the knob 118 may be separated by an angular distance greater than or less than 90°.

Figure 5:
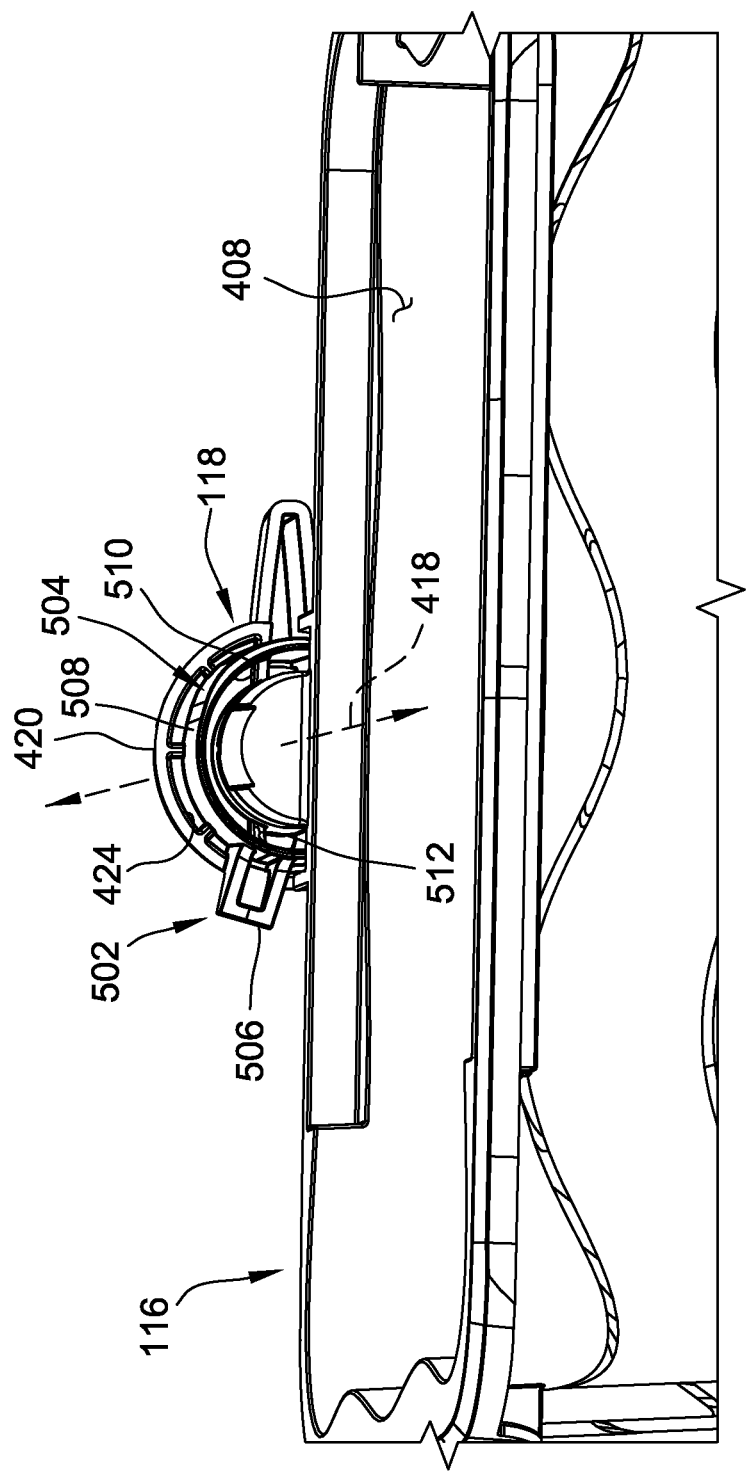
FIG. 5 is a perspective rear view of a portion of the debris container shown in FIG. 4.

Rotation of the knob 118 in the second rotational direction 434 (i.e., from the first position to the second position) causes movement of the debris container 116 in both the horizontal direction H and the vertical direction V to facilitate securing the debris container 116 to the housing 106 and sealing off the storage cavity 408. Specifically, with additional reference to FIG. 5, the knob 118 includes a first camming feature or cam 502 and a second camming feature or cam 504 that engage the housing 106 upon rotation of the knob 118 and thereby cause the debris container to move in both the horizontal and vertical directions H, V. Each of the first cam 502 and the second cam 504 is configured to cooperatively engage a corresponding camming feature of the housing 106 (described below) upon rotation of the knob 118 from the first position to the second position, and thereby move the debris container 116 in the horizontal and vertical directions H and V, respectively. As used herein, the terms "cam" and "camming feature" refer to an element of a camming system (i.e., a cammed surface or a structural element that engages a cammed surface) that causes linear motion of an object (in this embodiment, the debris container 116) upon rotational engagement with a corresponding element of the camming system (i.e., a cammed surface or a structural element that engages a cammed surface).

In the example embodiment, the first cam 502 includes a tooth 506 extending radially outward from the knob 118, and the second cam 504 includes an annular sidewall 508 having a cammed surface 510. The annular sidewall 508 extends from the second side 424 of the knob base 420. Further, in the example embodiment, the tooth 506 is connected to and extends radially outward from the annular sidewall 508, and the cammed surface 510 is defined along a radial inner surface of the annular sidewall 508. The annular sidewall 508 (specifically, the cammed or radial inner surface 510 of the annular sidewall 508) partially defines an annular slot 512 that extends circumferentially around the knob rotation axis 418.

Figure 6:
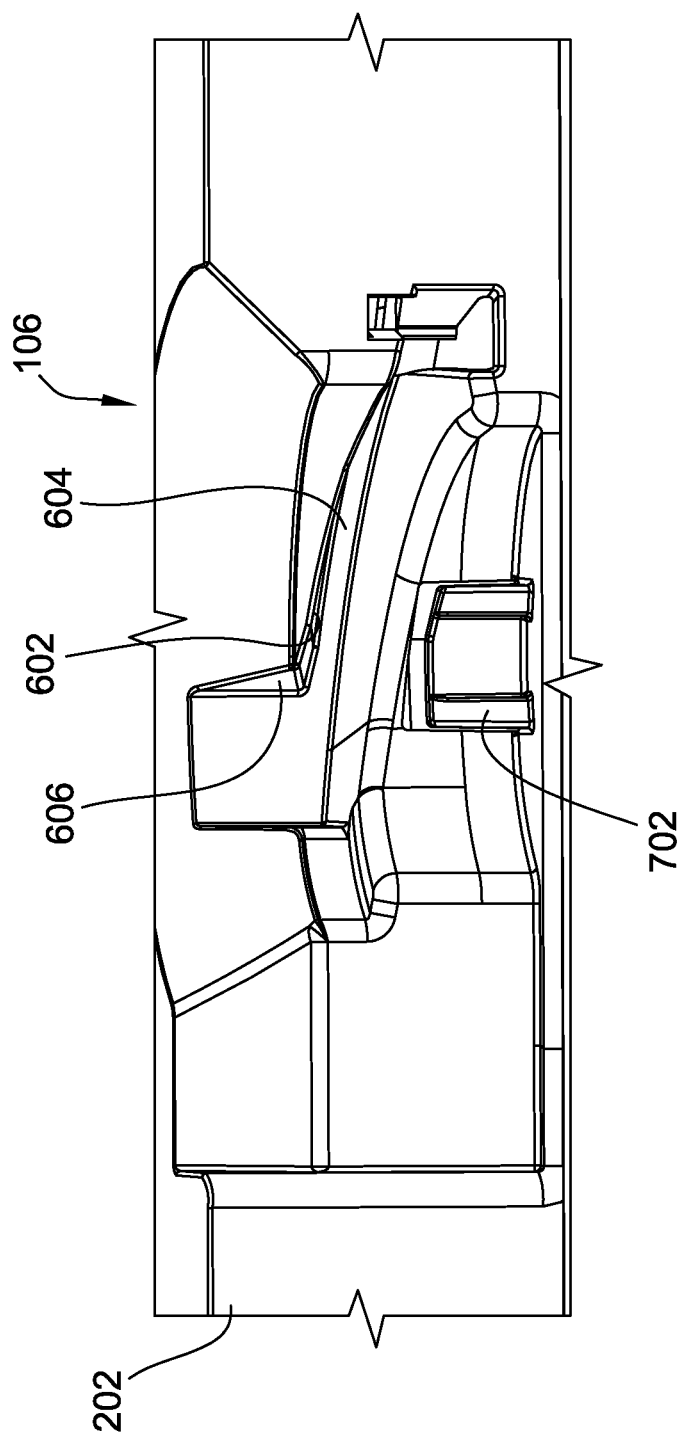
FIG. 6 is a bottom view of a portion of a housing of the vacuum cleaning system shown in FIG. 1.
Figure 7:
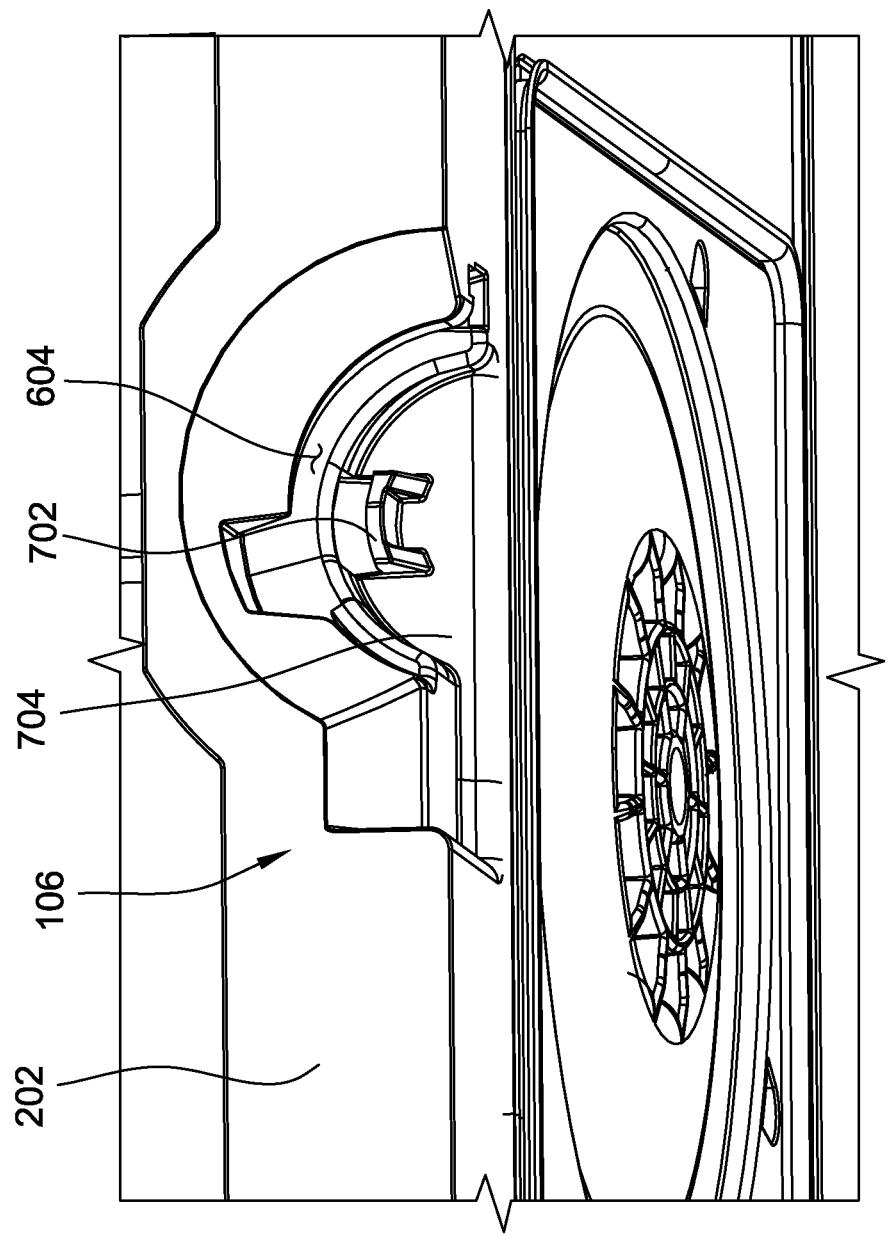
FIG. 7 is a perspective front view of a portion of the housing of the vacuum cleaning system shown in FIG. 1.

FIG. 6 is a bottom view of a portion of the housing top panel 202, and FIG. 7 is a front perspective view of the housing top panel 202. As shown in FIG. 6, the housing top panel 202 includes a cammed surface 602 partially defining an annular slot 604. The annular slot 604 is sized and shaped to receive the first cam 502 (specifically, the tooth 506) therein. Further, the top panel 202 includes a cutout or notch 606 sized and shaped complementary to the first cam 502 (specifically, the tooth 506). The notch 606 extends rearward through the top panel 202 and connects with the annular slot 604 such that the first cam 502 can be inserted through the notch 606 and into the annular slot 604. The cammed surface 602 is oriented to engage the first cam 502 (specifically, the tooth 506) upon rotation of the knob 118 from the first position to the second position to move the container 116 rearward in the horizontal direction H. In particular, the cammed surface 602 faces rearward (i.e., away from the front 212 of the housing 106), and is oriented at an oblique angle relative to the rotation axis 418. Consequently, when the tooth 506 is inserted into the annular slot 604 and the knob 118 rotated from the first position to the second position, the tooth 506 engages the cammed surface 602 and is forced rearward in the annular slot 604, forcing the knob 118 and the debris container 116 rearward with it.

With additional reference to FIG. 7, the housing 106 also includes a rib 702 extending outward from a recessed surface 704 of the housing top panel 202. The annular slot 512 (FIG. 5) defined by the knob annular wall 508 is sized and shaped to receive the rib 702 therein. Further, the cammed surface 510 defined by the knob annular wall 508 is oriented to engage the rib 702 upon rotation of the knob 118 from the first position to the second position to move the container 116 upward in the vertical direction V. In particular, the annular sidewall 508 defining the cammed surface 510 extends substantially parallel to the rotation axis 418 of the knob 118, and has a non-uniform thickness profile such that a portion of the cammed surface 510 extends into the annular slot 512, resulting in the annular slot 512 having a region of reduced thickness as compared to the remainder of the annular slot 512. Consequently, when the rib 702 is inserted into the annular slot 512 and the knob 118 rotated from the first position to the second position, the cammed surface 510 engages the rib 702 and is forced upward in the vertical direction V, forcing the knob 118 and the debris container 116 upward with it.

In other embodiments, the first cam 502 and the second cam 504 may have any suitable configuration that enables the dual-action latching mechanism 118 to function as described herein. In some embodiments, for example, the first cam 502 may include, in addition to or as an alternative to the tooth 506, a rib and/or a cammed surface that cooperatively engages a corresponding camming feature on the housing 106 to move the container 116 rearward in the horizontal direction H upon rotation of the knob 118. Additionally, in some embodiments, the second cam 502 may include, in addition to or as an alternative to the cammed surface 508, a tooth and/or a rib that cooperatively engages a corresponding camming feature on the housing 106 to move the container 116 upward in the vertical direction V upon rotation of the knob 118.

Figure 8:
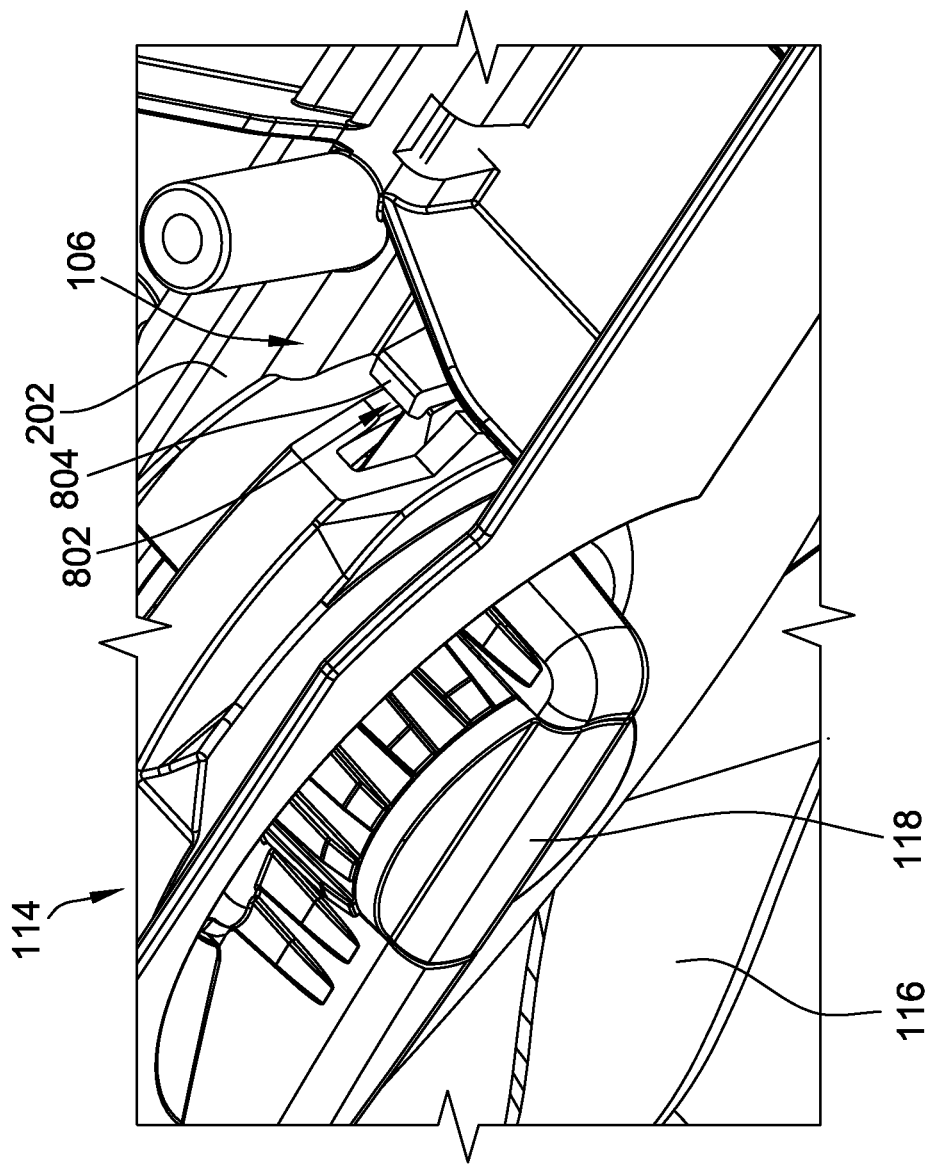
FIG. 8 is a perspective top view of a portion of the drum assembly shown in FIG. 2.

FIG. 8 is an enlarged perspective view of the drum assembly 114 shown in FIG. 2, and FIG. 9 is a partial sectional view of the drum assembly 114. As shown in FIGS. 8 and 9, the drum assembly 114 of the example embodiment (specifically, the housing top panel 202) includes a detent 802 (generally, a locking mechanism) that engages the first cam 502 (specifically, the tooth 506) when the knob 118 is in the latched or second position. The detent 802 is configured to inhibit rotation of the knob 118 in the first rotational direction 432 when the knob 118 is in the latched position. Specifically, when the knob 118 is rotated from the unlatched position to the latched position, the tooth 506 engages a ramped surface 804 of the detent 802, and causes the detent 802 to deflect radially outward to allow continued rotation of knob 118 in the second rotational direction 434. As the tooth 506 traverses the ramped surface 804, the detent 802 returns to its undeflected position, and engages the tooth 506 to prevent unintended rotation of the knob 118 in the first rotational direction 432. The knob 118 may be rotated in the first rotational direction 432 by applying sufficient force to the knob 118 to overcome the biasing force of the detent 802 on the tooth 506.

With references to FIGS. 2-7, in use, the debris container 116 is positioned within and secured to the housing 106 by sliding the debris container 116 into the housing 106 (specifically, the receptacle 208), and rotating the knob 118 in the second rotational direction 434 from the first position to the second position. Specifically, the rim 410 (FIG. 4) of the debris container 116 is inserted into the slots 222 (FIG. 2) defined by the housing side panels 206, and the debris container is slid along the ledges 220 in the horizontal direction H into the receptacle 208. The knob 118 is positioned in the first position while the debris receptacle 208 is slid into the housing 106 such that the tooth 506 (FIG. 5) can pass through the notch 606 (FIG. 6) defined in the housing top panel 202, and extend into the annular slot 604 defined by the cammed surface 602. Further, as the debris container 116 is inserted into the housing 106, the rib 702 (FIG. 7) extending from housing top panel 202 is received within the annular slot 512 (FIG. 5) defined by the knob annular wall 508.

When the debris container 116 is fully inserted into the receptacle 208, the knob 118 is rotated from the first position to the second position by rotating the knob 118 about the rotation axis 418 in the second rotational direction 434. Rotation of knob 118 causes the first cam 502 (specifically, the tooth 506) to engage the housing 106, and thereby move the debris container 116 rearward in the horizontal direction H. Specifically, rotation of the knob 118 in the second rotational direction 434 causes the tooth 506 to engage the cammed surface 602 defined by the housing top panel 202 (FIG. 6). Continued rotation of the knob 118 causes the tooth 506 to slide along the cammed surface 602, which forces the tooth 506 rearward in the annular slot 604 (FIG. 6), and thereby causes the debris container 116 to move rearward with the knob 118. As the debris container 116 moves rearward into the housing 106, the rim 410 engages the pivot points 302 (FIG. 3) defined by the ledges 220, causing the front 402 of the debris container 116 to rotate about the pivot points 302.

Additionally, rotation of knob 118 causes the second cam 504 to engage the housing 106, and thereby move the debris container 116 upward in the vertical direction V. Specifically, rotation of the knob 118 in the second rotational direction 434 causes the cammed surface 510 (FIG. 5) of the annular sidewall 508 to engage the housing rib 702 (FIG. 7). Continued rotation of the knob 118 causes the rib 702 to slide along the cammed surface 510, which forces the annular sidewall 508 and the knob 118 upward in the vertical direction V, and thereby causes the debris container 116 to move upward with the knob 118. In the example embodiment, engagement between the second cam 504 and the housing 106 causes the debris container 116 to rotate about the pivot points 302, and thereby causes the front 402 of the debris container 116 to move upward in the vertical direction V, while the rear or back of the debris container 116 remains relatively stationary. Upward movement of the debris container 116 resulting from rotation of the knob 118 compresses the seal 414 between the debris container upper surface 416 and the housing 106, thereby sealing off the storage cavity 408 and providing a substantially leak-free flow path from the inlet 108 to the outlet 110.

To remove the debris container 116 from the housing 106, the knob 118 is rotated in the first rotational direction 432 from the second position to the first position. Rotation of the knob 118 from the second position to the first position unseats the debris container 116 from the housing 106 such that the debris container 116 can freely slide along the ledges 220. When the knob 118 is in the first position, and the tooth 506 of the first cam 502 is aligned with the notch 606, the debris container 116 is removed from the housing 106 by sliding the debris container 116 along the ledges 220 in the horizontal direction H out of the receptacle 208. Dust and other debris within the debris container 116 can then be discarded.

Embodiments of the vacuum cleaning systems described herein provide several advantages over prior art devices. For example, embodiments of the vacuum cleaning systems described herein provide a slide-out vacuum drum or container that can be secured (i.e., latched) to the vacuum housing with a single hand. In particular, embodiments of the vacuum cleaning system include a slide-out vacuum drum that includes a rotatable knob with two cams or camming features that both engage the housing upon rotation of the knob to move the debris container in respective horizontal and vertical directions. Engagement of the camming features with the housing moves the debris container in both the horizontal direction and the vertical direction such that a seal is compressed between the debris container and the housing to seal off a storage cavity defined by the debris container. Further, the knob is rotatable with a single hand in some embodiments such that the debris container can be secured to the vacuum cleaner housing (e.g., by rotating the knob from an unlatched position to a latched position) with a single hand.

Additionally, embodiments of the vacuum cleaning system include a housing that defines one or more pivot points about which the slide-out vacuum drum rotates when fully inserted into the housing. In particular, some embodiments include a vacuum housing that defines pivot points in a rear of the housing that allow a front of the debris container to rotate upward about the pivot points. The use of pivot points in the rear of the housing facilitate rotating the front of container upward, as opposed to raising the entire debris container, and thereby reduces or limits the force needed to rotate the knob and latch the debris container to the vacuum cleaner housing.

Example embodiments of vacuum cleaning systems are described above in detail. The vacuum cleaning systems are not limited to the specific embodiments described herein, but rather, components of the vacuum cleaning systems may be used independently and separately from other components described herein. For example, the latching mechanisms described herein may be used with vacuum cleaners other than vehicular vacuum cleaning systems, including without limitation, wet/dry vacuum cleaners, canister vacuum cleaners, upright vacuum cleaners, and backpack vacuum cleaners.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing(s) shall be interpreted as illustrative and not in a limiting sense.

What is claimed is:

1. A vacuum cleaning system comprising:
a housing defining an inlet and an outlet;
a motor connected to the housing and adapted to generate air flow through the housing from the inlet to the outlet; and
a debris container received within the housing in a first direction, the debris container including a knob rotatably connected thereto such that the debris container and the knob are removable from the housing as a unit, wherein the knob is rotatable about an axis and includes a first cam and a second cam;
wherein rotation of the knob about the axis causes the first cam to engage the housing and thereby move the debris container in the first direction, and causes the second cam to engage the housing and thereby move the debris container in a second direction that is perpendicular to the first direction; and
wherein the first cam includes a tooth extending radially outward from the knob, and wherein the housing has a slot defined therein, the slot sized and shaped to receive the tooth therein, the housing including a cammed surface at least partially defining the slot, wherein the cammed surface is oriented to engage the tooth upon rotation of the knob to move the container in the first direction.

2. The vacuum cleaning system of claim 1, wherein the debris container defines a storage cavity, wherein a seal is disposed adjacent an upper surface of the container, wherein the second cam is configured to engage the housing upon rotation of the knob and thereby move the container in the second direction such that the seal is compressed between the container and the housing to seal the storage cavity.

3. The vacuum cleaning system of claim 1, wherein the second cam includes an annular wall having a second cammed surface, and wherein the housing includes a rib extending outward from a recessed surface of the housing, wherein the second cammed surface at least partially defines an annular slot sized and shaped to receive the rib therein, wherein the second cammed surface is oriented to engage the rib upon rotation of the knob to move the container in the second direction.

4. The vacuum cleaning system of claim 1, wherein the housing includes a pair of opposing side panels, each side panel including a ledge that at least partially defines a side slot extending into the housing in the first direction, and wherein the container includes a rim that slidably engages the ledges when the container is inserted into the housing.

5. The vacuum cleaning system of claim 4, wherein each side slot extends rearwardly into the housing from an opening defined in a front of the housing, wherein at least one of the ledges defines a pivot point located rearwardly from the front of the housing in the corresponding slot, wherein the rim is configured to engage the pivot point when the container is inserted into the housing such that rotation of the knob about the rotation axis and engagement of the first and second cams with the housing causes the container to rotate about the pivot point.

6. The vacuum cleaning system of claim 1, wherein the knob is rotatable in a first rotational direction and a second rotational direction opposite the first rotational direction, rotation in the first rotational direction causing the first and second cams to engage the housing and thereby move the container in the first and second directions, wherein the housing further includes a detent that engages the first cam to inhibit rotation of the knob in the second rotational direction.

7. The vacuum cleaning system of claim 6, wherein the detent engages the tooth to inhibit rotation of the knob in the second rotational direction.

8. The vacuum cleaning system of claim 1, wherein the housing defines a receptacle sized and shaped to receive the debris container therein, and wherein the housing includes a front having an opening defined therein to allow the debris container to be inserted into and removed from the receptacle.

9. The vacuum cleaning system of claim 1 in combination with a vehicle, wherein the vacuum cleaning system is installed in the vehicle.

10. A drum assembly for a vacuum cleaning system, the drum assembly comprising:
a housing;
a debris container received within the housing in a first direction and removable therefrom; and
a knob rotatably connected to the debris container such that, when the debris container is removed from the housing, the knob is removed from the housing with the debris container, wherein the knob is rotatable about an axis and includes a first cam and a second cam;
wherein rotation of the knob about the axis causes the first cam to engage the housing and thereby move the debris container in the first direction, and causes the second cam to engage the housing and thereby move the debris container in a second direction that is perpendicular to the first direction; and
wherein the first cam includes a tooth extending radially outward from the knob, and wherein the housing has a slot defined therein, the slot sized and shaped to receive the tooth therein, the housing including a cammed surface at least partially defining the slot, wherein the cammed surface is oriented to engage the tooth upon rotation of the knob to move the container in the first direction.

11. The drum assembly of claim 10, wherein the second cam includes an annular wall having a second cammed surface, and wherein the housing includes a rib extending outward from a recessed surface of the housing, wherein the second cammed surface at least partially defines an annular slot sized and shaped to receive the rib therein, wherein the second cammed surface is oriented to engage the rib upon rotation of the knob to move the container in the second direction.

12. The drum assembly of claim 10, wherein a seal is disposed adjacent an upper surface of the container, wherein the second cam is configured to engage the housing upon rotation of the knob and thereby move the container in the second direction such that the seal is compressed between the container and the housing.

13. The drum assembly of claim 10, wherein the housing includes a pair of opposing side panels, each side panel including a ledge that at least partially defines a side slot extending into the housing in the first direction, and wherein the container includes a rim that slidably engages the ledges when the container is inserted into the housing.

14. The drum assembly of claim 13, wherein each side slot extends rearwardly into the housing from an opening defined in a front of the housing, wherein at least one of the ledges defines a pivot point located rearwardly from the front of the housing in the corresponding slot, wherein the rim is configured to engage the pivot point when the container is inserted into the housing such that rotation of the knob about the rotation axis and engagement of the first and second cams with the housing causes the container to rotate about the pivot point.

15. The drum assembly of claim 10, wherein the knob is rotatable in a first rotational direction and a second rotational direction opposite the first rotational direction, rotation in the first rotational direction causing the first and second cams to engage the housing and thereby move the container in the first and second directions, wherein the housing further includes a detent that engages the first cam to inhibit rotation in the second rotational direction.

16. The drum assembly of claim 15, wherein the detent engages the tooth to inhibit rotation of the knob in the second rotational direction.

17. The drum assembly of claim 10, wherein the housing defines a receptacle sized and shaped to receive the debris container therein, and wherein the housing includes a front having an opening defined therein to allow the debris container to be inserted into and removed from the receptacle.

18. A method of using a vacuum cleaning system including a housing defining an inlet and an outlet, and a motor adapted to generate air flow through the housing from the inlet to the outlet, the method comprising: inserting a debris container into the housing, the debris container including a knob rotatably connected thereto, the debris container and the knob removable from the housing as a unit, the knob having a first cam and a second cam and rotatable from a first, unlatched position to a second, latched position; and rotating the knob from the first position to the second position, wherein rotation of the knob from the first position to the second position causes the first cam to engage the housing and thereby move the debris container in a first direction, and causes the second cam to engage the housing and thereby move the debris container in a second direction that is perpendicular to the first direction; wherein rotation of the knob is inhibited by engagement of a tooth of the first cam with a detent of the housing.

19. The method of claim 18 including compressing a seal between the debris container and the housing by rotating the knob from the first position to the second position.

20. The method of claim 18 comprising rotating the knob from the second position to the first position to unseat the debris container from the housing and removing the debris container from the housing.

* * * * *